United States Patent
Wiese et al.

(10) Patent No.: US 6,209,178 B1
(45) Date of Patent: Apr. 3, 2001

(54) FASTENING CLIP

(75) Inventors: Heiner Wiese, Norderstedt; Albert Sbongk, Niederstetten, both of (DE)

(73) Assignee: ITW-ATECO G.m.b.H., Rottingen (DE)

( * ) Notice: Subject to any disclaimer, the term of this patent is extended or adjusted under 35 U.S.C. 154(b) by 0 days.

(21) Appl. No.: 09/349,254

(22) Filed: Jul. 8, 1999

(30) Foreign Application Priority Data

Jul. 9, 1998 (DE) .............................. 198 30 752

(51) Int. Cl.[7] .............................. A44B 21/00; F16B 13/06
(52) U.S. Cl. .................. 24/458; 24/289; 24/297; 24/453; 411/508
(58) Field of Search .............................. 24/458, 453, 297, 24/289; 411/508, 509

(56) References Cited

U.S. PATENT DOCUMENTS

| | | | |
|---|---|---|---|
| 4,716,633 | * | 1/1988 | Rizo ........................................ 24/297 |
| 5,301,396 | * | 4/1994 | Benoit ...................................... 24/297 |
| 5,319,839 | * | 6/1994 | Shimajiri ................................. 24/297 |
| 5,704,753 | * | 1/1998 | Ueno ....................................... 24/297 |
| 5,850,676 | * | 12/1998 | Takahashi et al. ...................... 24/453 |

FOREIGN PATENT DOCUMENTS

1444846 * 8/1976 (GB) ....................................... 24/297

* cited by examiner

*Primary Examiner*—Victor N. Sakran
(74) *Attorney, Agent, or Firm*—Lowe Hauptman Gilman & Berner, LLP.

(57) ABSTRACT

A fastening clip structured to attach a plate-shaped structural part with a second plate-shaped part is disclosed. The parts have fastening openings, one of the openings being oblong. The clip includes a head having a radial conical flange adapted to engage the respective structural part, and a shank having a plurality of resilient legs, the legs being connected to the head at the upper end thereof and forming a conical insertion tip at the free end thereof. The outer sides of the legs have a shoulder adapted to cooperate with the edge of the hole, wherein four legs are provided circumferentially spaced by 90°, the legs being separated by relatively broad slots extending from flange to the insertion tip, the maximum diameter of the shank at the level of the shoulders being slightly larger than the shortest diameter of the oblong hole.

5 Claims, 1 Drawing Sheet

FASTENING CLIP

TECHNICAL FIELD

The invention relates to a fastening clip for connecting two plate-shaped structural parts.

BACKGROUND ART

Such fastening clips are known in the most varied of design embodiment forms and generally include a head that comprises a conical flange which more or less sealingly bears against the facing side of the structural part and is axially deformable in a limited manner in order to ensure a height compensation. On the head of the fastening clip there is formed a shank which consists of two or more legs which may be radially sprung and which at the free end run out into an introduction end and in each case comprise a shoulder radially on the outside, with which a hole edge is gripped from behind.

Such fastening clips are normally injection moulded as one piece from plastic material. Their attachment often requires a considerable application force which however is mostly smaller than the holding force.

It is the object of the invention to provide a fastening clip for connecting two plate-shaped structural parts comprising fastening holes, which by way of a slight finger pressure may be mounted in the fastening hole, which at the same time ensures a relatively high holding force and which furthermore may be unloseably preassembled in a structural part with an oblong fastening hole. Furthermore the fastening clip is manufactured with minimal expense.

SUMMARY OF THE INVENTORY

With the fastening clip according to the invention there are spaced four legs arranged in the circumferential direction by about 90°, which are separated by relatively wide slots extending from the flange to the introduction end. The individual legs comprise on the outer side a shoulder with a maximum diameter which is somewhat larger than the smallest diameter of the oblong hole. Preferably, the shoulders are circular in cross section as also the legs below the shoulders in cross section have a circular contour so that a type of basket is formed which in relation to the leg sections above the shoulders in the direction of the head is relatively stable, by which means a high holding force is created. The thin leg sections above the shoulders permit a simple spring deflection of the legs on introducing into the fastening hole so that the pressing in force is conceivable small. If the introduction or assembly force is for example maximumly 60N, then accordingly the holding force after locking into the fastening hole is at least 250 N.

For the series manufacture of such a fastening clip it is advantageous when the head comprises an axial oblong opening which is aligned with two diametrically arranged slots in the shank, wherein the ends of the opening lie on an axis to the shaft axis which extend through neighbouring circumferential ends of neighbouring shoulders. In this manner a core may be introduced over the oblong hole into the shank region of the fastening clip which at the same time forms two diametrical slots between the legs. The two other diametrically oppositely lying slots are then created with the help of the sliders of the injection moulding mould.

According to another formation of the invention above the flange there is formed a cup-shaped portion which on the upper side is deepened in a concave manner. In this manner the assembly of the fastening clip may be simplified by finger pressure.

One embodiment of the invention is hereinafter described in more detail by way of drawings.

BEST MODE FOR CARRYING OUT THE INVENTION

Figure 1:
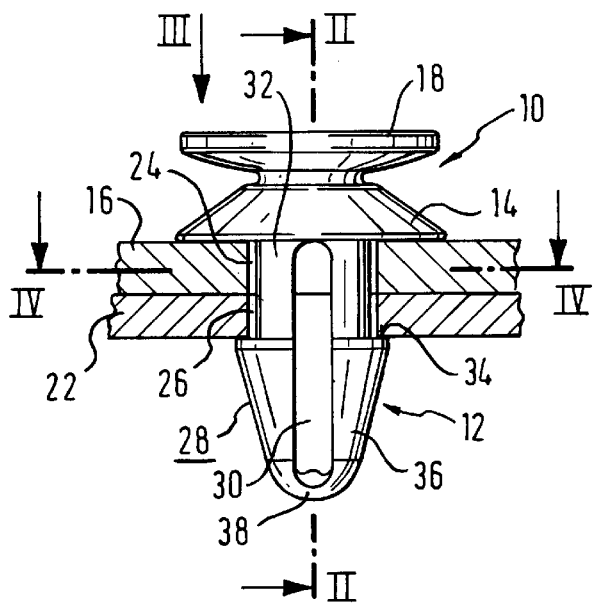
FIG. 1 is a sectional view of a fastening clip according to the invention in an assembled position.
Figure 2:
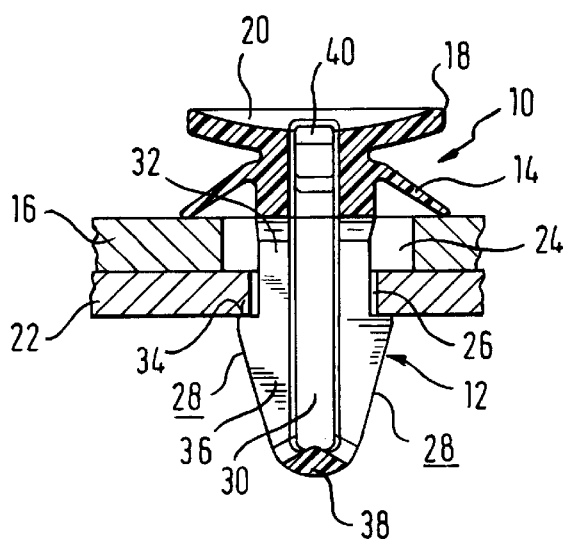
FIG. 2 is a section through the fastening clip according to FIG. 1 along line II—II.
Figure 3:
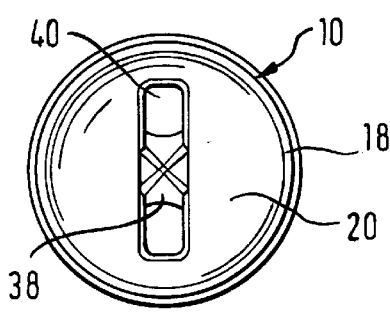
FIG. 3 is a plan view of the fastening clip according to FIG. 1 in the direction of arrow III.

The fastening clip shown in FIGS. 1 and 2 comprises a head 10 and a shank 12. The head 10 has a cone-like radial circular flange 14 which bears against the facing outer side of a plate-shaped structural part 16. The head 10 further comprises above the flange 14 a cup-shaped portion 18 which is formed ball-cap shaped and on the upper side comprises a concave recess 20. The concave recess provides for the improved use of a detent force of the fastening clip with finger pressure.

The shank 10 extends through fastening holes of the plate-shaped structural part 16 as well as the plate-shaped structural part 22. At 24 the fastening hole of the structural part 16 and at 26 the fastening hole of the structural part 22 are indicated. The first hole is oblong, as is deduced from the common observation of FIGS. 1 and 2. The second hole is circular.

Figure 4:
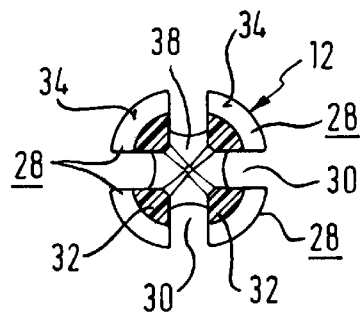
FIG. 4 is a section through the fastening clip according to FIG. 1 along the line IV—IV.

The shank 12 comprises four legs 28 arranged at a circumferential distance of 90°. The legs 28 are separated from one another by relatively wide, straight, axially parallel slots 30. The legs 28 are connected to the head 10, and specifically via a relatively thin leg section 32 which in cross section is approximately triangular, but with a circular outer contour (FIG. 4). The leg sections 32 extend up to the shoulders 34 which in the circumferential direction has a circular contour and lies on a circle whose diameter is larger than the smallest diameter of the oblong hole 24. By way of this the shank 12 may be preassembled in the oblong hole without there arising the danger that the fastening clip releases.

Below the shoulders 34 there are provided leg sections 36 which form a conical introduction end that tapers downwards to a rounded introduction tip 38. In cross section the leg sections 36 are likewise also circular. By way of this a type of basket is formed which is relatively stable in comparison to the leg sections 32. On introduction of the fastening clip into a fastening hole the shoulders 34 yield slightly so that only a relatively slight finger pressure is sufficient to assemble the fastening clip. The relatively large shoulders and the more stable leg sections 36 however ensure a high withdrawal force.

The shaping of the fastening clip according to the FIGS. 1 to 4 is effected in an injection moulding mould, wherein the core can be guided via an oblong opening 40 whose extension in the longitudinal direction reaches until up to the shoulders 34. Diametrically oppositely lying slots, as can be seen in FIG. 2 are therefore moulded with the help of the core (not shown), whilst the other two diametrical slots 30 which only extend to the lower edge of the flange 14 are formed by slider parts which are a component of the injection moulding mould.

What is claimed is:

1. A fastening clip of one piece construction structured to attach a first plate-shaped structural part with a second plate-shaped part, the parts having fastening openings, one of the openings being oblong, the clip comprising a head having a radial conical flange adapted to engage a surface of one of the structural parts, a shank having a plurality of resilient legs, the legs being connected to the head at upper ends thereof and forming a conical insertion tip at lower free ends thereof, outer sides of the legs having a shoulder at intermediate portions adapted to engage with a bottom edge of one of the openings, wherein four of said legs are provided at circumferentially spaced intervals of 90°, the legs being respectively separated by slots (30) extending from the flange (14) to the insertion tip (38), the maximum diameter of the shank (12) at the level of the shoulders (34) is slightly larger than the smallest diameter of the oblong hole (24).

2. The clip of claim 1, wherein an outer contour of the shoulders (34) is located on a common circle.

3. The clip of claim 1, wherein an outer contour of the legs (28) above and below the shoulders (34) is circularly shaped.

4. The clip of claim 1, wherein an elongated axial opening (40) is formed in the head (10), the opening being aligned with two diametrically located one of slots (30), the ends of the opening (40) are aligned with an axis parallel to the axis of the shank which extends through adjacent circumferential ends of adjacent shoulders (34).

5. The clip of claim 1, wherein a cup shaped portion (18) is formed above the flange (14), the upper side of the cup-shaped portion being concave (20).

* * * * *